United States Patent
Ayyadevara et al.

(10) Patent No.: US 12,034,854 B2
(45) Date of Patent: *Jul. 9, 2024

(54) PROVIDING SINGLE SIGN-ON (SSO) IN DISJOINT NETWORKS WITH NON-OVERLAPPING AUTHENTICATION PROTOCOLS

(71) Applicant: Akamai Technologies, Inc., Cambridge, MA (US)

(72) Inventors: Seetharama Ayyadevara, San Jose, CA (US); Seemant Choudhary, Fremont, CA (US); Stephan Benny, Sunnyvale, CA (US); Punit Kandoi, Sunnyvale, CA (US); Pravin Tatti, Sunnyvale, CA (US)

(73) Assignee: Akamai Technologies, Inc., Cambridge, MA (US)

(*) Notice: Subject to any disclaimer, the term of this patent is extended or adjusted under 35 U.S.C. 154(b) by 5 days.

This patent is subject to a terminal disclaimer.

(21) Appl. No.: 17/180,821

(22) Filed: Feb. 21, 2021

(65) Prior Publication Data

US 2021/0176061 A1   Jun. 10, 2021

Related U.S. Application Data

(63) Continuation of application No. 15/683,466, filed on Aug. 22, 2017, now Pat. No. 10,931,452.

(Continued)

(51) Int. Cl.
*H04L 9/32*   (2006.01)
*H04L 9/14*   (2006.01)
(Continued)

(52) U.S. Cl.
CPC .............. *H04L 9/3213* (2013.01); *H04L 9/14* (2013.01); *H04L 9/3226* (2013.01);
(Continued)

(58) Field of Classification Search
CPC ............... H04L 9/32–3249; H04L 9/14; H04L 63/08–0892; H04L 63/06–068; H04L 2463/082; H04W 12/06–069
See application file for complete search history.

(56) References Cited

U.S. PATENT DOCUMENTS 7,412,720 B1 *   8/2008   Frey ...................... H04L 63/168
                                                                726/8
9,137,131 B1 *   9/2015   Sarukkai ............. H04L 63/0815
(Continued)

*Primary Examiner* — Madhuri R Herzog
(74) *Attorney, Agent, or Firm* — David H. Judson

(57) ABSTRACT

A method of enabling single sign-on (SSO) access to an application executing in an enterprise, wherein authorized, secure access to specific enterprise applications are facilitated via an enterprise-based connector. In response to successful authentication of an end user via a first authentication method, a credential associated with the successful authentication is encrypted to generate an encrypted user token. The encrypted user token is then forwarded for storage in a database accessible by the enterprise-based connector. Following a redirect (e.g., from a login server instance) that returns the end user to the enterprise-based connector, the encrypted user token is fetched and decrypted to recover the credential. The credential so recovered is then used to attempt to authenticate the user to an application via a second authentication method distinct from the first authentication method. Typically, the first authentication method is an HTML form-based authentication initiated from a client browser, and the second authentication method is one of: NTLM, and Kerberos.

13 Claims, 5 Drawing Sheets

Related U.S. Application Data

(60) Provisional application No. 62/377,754, filed on Aug. 22, 2016.

(51) Int. Cl.
    *H04L 9/40*         (2022.01)
    *H04W 12/06*      (2021.01)
    *H04W 12/069*     (2021.01)

(52) U.S. Cl.
    CPC ....... *H04L 63/0815* (2013.01); *H04W 12/068* (2021.01); *H04W 12/069* (2021.01); *H04L 63/062* (2013.01); *H04L 2463/082* (2013.01)

(56) References Cited

U.S. PATENT DOCUMENTS

| | | | | |
|---|---|---|---|---|
| 2007/0006291 | A1* | 1/2007 | Barari | G06F 21/41 |
| | | | | 726/10 |
| 2007/0143836 | A1* | 6/2007 | Bowers | H04L 63/0884 |
| | | | | 726/10 |
| 2008/0046715 | A1* | 2/2008 | Balazs | H04L 63/0815 |
| | | | | 713/152 |
| 2010/0306547 | A1* | 12/2010 | Fallows | H04L 63/0815 |
| | | | | 713/178 |
| 2015/0350168 | A1* | 12/2015 | Hayton | G06F 21/32 |
| | | | | 713/168 |

* cited by examiner

PROVIDING SINGLE SIGN-ON (SSO) IN DISJOINT NETWORKS WITH NON-OVERLAPPING AUTHENTICATION PROTOCOLS

BACKGROUND

Technical Field

This application relates generally to secured access to enterprise-based applications that are accessible via non-corporate networks.

Brief Description of the Related Art

An application program is a computer program, or group of programs, that configures a computer to perform functions directly for a user of the application. This is in contrast to system programs, which typically provide one or more software program infrastructure layers, such as an operating system, utilities and related components that manage and integrate a computer's capabilities but typically do not perform tasks directly for the user. In general, the system software serves the application, which in turn, serves the user.

A hosted application is an application that runs on a server that multiple user devices have shared access to over a network. A browser may act as an interface between a hosted application and a user device, for example. Hosted applications may include client and server components in which a client that runs directly on a user device communicates over a network with a hosted component that runs on a server. A downloadable application, sometimes referred to as an "app," for example, may act as client interface between a hosted application and a user device. Hosted applications may run on dedicated servers owned and operated by an individual organization. Alternatively, hosted applications may run on a so called cloud computing platform in which servers are virtualized and hardware and software compute resources are shared by other hosted applications.

Enterprises have been trained to think of security in terms of a physical barrier at the perimeter of the network. This model worked well as recently as several years ago when all applications were deployed in enterprise controlled data centers and an IT department controlled not only the application, but the server and networking infrastructures, as well as the data center real estate.

Today, enterprises have a cost-effective option available in the form of public clouds, which can be utilized in addition to the enterprise datacenter strategy. Public cloud deployments can enable enterprises to enjoy reduction in operational (including manpower) and capital expenditures. Some enterprises are therefore choosing to maintain hybrid environments where applications are deployed in the most practical location, be it an enterprise-controlled data center, infrastructure-as-a-service (IaaS) platform, or another similar point of presence.

In many cases, hosted applications act as a utility to enterprise employees to carry out their day-to-day activities. In this context, it is important to make sure that only users that are allowed access to a particular application can actually access it, and more importantly, that no external bad actors can access these hosted applications. To achieve this, enterprises have traditionally deployed a multi-layer security infrastructure.

A traditional multi-layer security infrastructure can pose a number of practical challenges. First, for example, each security feature presents a technical challenge to configure and manage, with the enterprises having to make a tradeoff between the level of security that it can deliver on the one hand, and the skillset and operational expertise required to configure and maintain the security on the other hand. This tradeoff may result in an enterprise choosing to deliver a less-than-ideal user experience. For example, users may only be allowed access to certain applications from a branch office location or users may only be allowed access to certain applications from certified devices.

In the past, some enterprises have concluded that the safest approach is to house all hosted applications in a single location. Nevertheless, for business reasons enterprises often house hosted applications in multiple locations. One common security model used by enterprises that house hosted applications at multiple locations involves a "moat" approach in which the enterprise builds a full-service security moat around each physical location housing hosted applications so that each location is protected independently. This approach, however, leads to higher operational and capital expenditures. Another common security model involves a "port of entry" approach in which the enterprise designates a physical location as the entry point for all application traffic. Traffic destined for other physical locations is then routed through an overlay, enterprise-managed network (typically built using private links, e.g., IPSec tunnels, etc.). This approach, however, leads to higher end-to-end round-trip times and, consequently, degraded performance. Some enterprises may also deploy a combination of the moat and port of entry approaches.

Another problem that arises in this scenario is that the applications sought to be accessed may be configured for access via multiple, distinct authentication methods. Often, it is desirable to maintain intact existing authentication methods so as to reduce changes on the application server that might otherwise be necessary. Thus, for example, a typical enterprise that uses Microsoft Active Directory (AD) as a user directory tends to use two popular authentication methods for application access, namely, NTLM and Kerberos. Both of these authentication methods provide the end user with single sign on (SSO) experience. When the user is not connected to the corporate network, however, both of these authentication methods have significant shortcomings in authenticating users. Thus, for example, NTLM is a connection-oriented authentication protocol and assumes that the user is directly connected to the application server. Direct connectivity, however, is not available in environments where there is a middle box (such as HTTP proxy or a L7 load balancer), which terminates user connections and re-establishes a new connection to the application server and thus does not have a user notion. Kerberos, on the other hand, requires that the user have access to Kerberos Key Distribution Center (KDC) to obtain a Ticket Granting Ticket (TGT) and a Service Ticket (ST) to authenticate with and gain access to the application server. This requires user to be in the same network as the KDC.

Generalizing, problems arise when users are accessing the application from non-corporate networks (such as home networks or via cellular networks or hotels networks) that employ middle proxies to terminate a user connection for traffic filtering or some other purposes, and re-open a new connection to the application. In these circumstances, often times user-facing and application server-facing connections are not created, used and destroyed in a symmetric fashion. Moreover, sometimes a new connection toward the application server is created for every HTTP request of the user from the same user connection. This behavior can result in repeated authentication challenges to the user. Further, application-facing connections are reused across many users, and this can lead to lateral privilege leakage.

There remains a need to provide or enable SSO experience (often with multi-factor user authentication) is a disjoint network operating scenario when then are a plurality of non-overlapping authentication methods across application servers. The technique of this disclosure addresses this need.

BRIEF SUMMARY

This disclosure describes a method and system for providing Single-Sign On (SSO) and optional multi-factor authentication to end users while accessing enterprise applications from any network (including a corporate network) with no changes to the application server in an environment when there is a plurality of authentication methods configured for user authentication.

According to a particular embodiment, a method of enabling single sign-on (SSO) access to an application executing in an enterprise, wherein authorized, secure access to specific enterprise applications are facilitated in part via an enterprise-based connector. In response to successful authentication of an end user via a first authentication method, a credential associated with the successful authentication is encrypted to generate an encrypted user token. The encrypted user token is then transported for storage, preferably in a shared database accessible by the enterprise-based connector. Following a redirect (e.g., from a login server instance) that returns the end user to the enterprise-based connector, the encrypted user token is fetched and decrypted to recover the credential. The credential so recovered is then used to attempt to authenticate the user to an application via a second authentication method distinct from the first authentication method. In particular, the enterprise connector decrypts the token and, based on the configured authentication scheme or authentication challenge from the enterprise origin, performs the single sign-on function. Typically, the first authentication method is an HTML form-based authentication initiated from a client browser, and the second authentication method is NTLM, Kerberos, or authentication method(s) that rely upon the same set of credentials encrypted in the user token.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

By way of background, the following describes a dynamically scalable secure application delivery system and associated method in which the techniques of this disclosure may be practiced.

Terminology

Throughout this disclosure, there is reference to "connection," "communication path" and "network communication path." As used herein, these terms are used interchangeably to refer to logical two-way communication paths that permit communication of information between two endpoints. A communication path may include multiple connections. The terms "connection," "communication path" and "network communication path" may refer to one or more individual HTTPS connections that create such a logical path. An individual connection includes two endpoints, one on each end of the connection, which include data structures used to manage the flow of information through the connection and include associated buffers used in the sending and receiving of information over the connection.

System Overview

Figure 1:
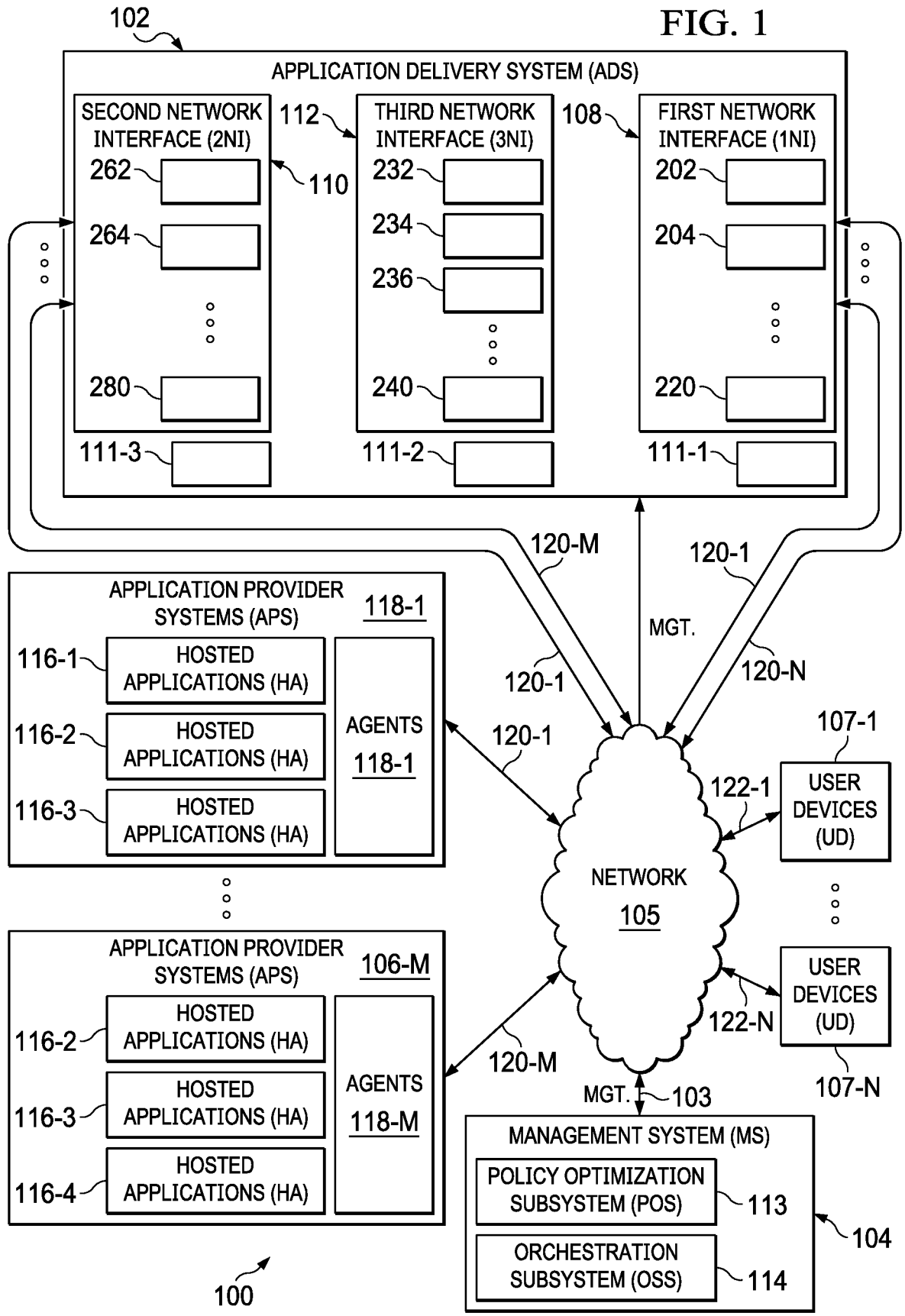
FIG. 1 is an illustrative architecture level block diagram representing a security management system in accordance with some embodiments.

FIG. 1 is an illustrative architecture level block diagram representing a security management system 100 that includes an application delivery system 102 and management system 104 to impose policy based secure access to hosted applications 116 from application provider systems 106 to user devices 107 over a network 105 in accordance with some embodiments. Delivery of an application involves providing user device access to a hosted application that runs on a server that is accessible to user devices over the network 105. More particularly, delivery of a hosted application may involve providing user device access over the network 105 to services, functionality and information provided by the hosted application, for example.

An application provider may be an individual, a company or other entity, for example, which makes available an application provider system 106. In some embodiments, an application provider system 106 hosts an application within a data center. In general, a data center includes a private environment that includes one or more computer systems, maintained by an entity, such as a business, within which critical applications are housed. A data center typically also includes a number of security systems (e.g. firewalls) that act to block unwanted, unfettered access from outside the data center. A data center can be maintained from the real-estate up by the business, or may include a virtualized computer environment that uses virtual machines that run on shared computation and storage resources in a shared network environment, such as a cloud computing environment, also referred to as "Infrastructure as a Service (IaaS)."

A private application provider system comprises a private network. In some embodiments, a private network operates on a private address space that is protected behind a firewall that that hides internal private network addresses (e.g., IP addresses) from an external network, such as the Internet, by applying network and/or port address translation for traffic to and from the private network. Moreover, a firewall typically allows only select traffic to enter the private network from the external network.

The application delivery system 102 is configured to impart security services to communications over the network 105, which may include one or more networks, such as the Internet, between an application hosted within a private computing environment maintained by an application provider systems 106, e.g. a data center or a shared cloud computing platform, and an end-user device 107, such as a smartphone, media player, personal digital assistant (PDA), computer, laptop computer or tablet computing device. In some embodiments, a private application provider system is protected by a firewall from the network 105. The application delivery system 102 provides services that condition communication between end-user devices 107-1 to 107-N and applications hosted by an application provider system 106 upon meeting security requirements. The system 102 can be configured to provide end-user device access to applications hosted within a data center while ensuring that security requirements are met. In accordance with some embodiments, the application delivery system 102 can provide, in parallel, different sets of security services for different applications hosted by different provider systems.

The application delivery system 102 includes dynamically configurable first network interface 108, also referred to herein as the frontend traffic delivery layer 108 that manages flow of network traffic over the network 105 with multiple end-user devices 107-1 to 107-N and a dynamically configurable second network interface 110, also referred to herein as the backend traffic delivery layer 110 that manages flow of network traffic over the network 105 with multiple application provider systems 106-1 to 106-M. The application delivery system also includes a dynamically configurable network security interface 112, also referred to herein as the traffic processing layer 112, which provides security services to identify a device users making a connection requests since certain user may be blocked. The traffic processing layer 112 also may identify device type used to make a connection request since certain device types may be blocked. Moreover, the traffic processing layer 112 provides network connection stitching services to connect frontend user device network communication paths with backend provider systems network communication paths.

The application delivery system 102 includes a first performance monitoring module 111-1 to monitor load on traffic director instances within the frontend traffic delivery layer 108 and report to the management system 104. It includes a second performance monitoring module 111-2 to monitor load on traffic director instances within the backend traffic delivery layer 110 and report to the management system 104. It includes a third performance monitoring module 111-3 to monitor load on traffic processing service instances within the traffic processing layer 112 and report to the management system 104.

The orchestration subsystem 114 manages changes to the configuration of the application delivery system 102 and agents 118-1 to 118-M to meet performance objectives. The application delivery system 102 provides hardware compute resources, such as processors and storage devices, that can be used to independently scale up and scale down the layers 108, 110 and 112 on demand, under control of the management system 104, depending upon load, e.g., user demand or distributed attacks on service availability. More particularly, in response to determinations made using the policy optimization subsystem 113, the orchestration subsystem 114 can control the application delivery system 102 in scaling up and down the number of first network interface instances, also referred to herein as, frontend traffic director instances (202, 204, ... 220) within the frontend traffic delivery layer 108, the number of second network interface instances, also referred to herein as, backend traffic director instances (262, 264, ... 280) within the frontend traffic delivery layer 110 and the service providing instances (232, 234, 236, ... 240) within the traffic processing layer 112.

Each of multiple application provider systems 106-1 to 106-M is configured to host at least one application. Applications 116-1, 116-2 and 116-3, for example, are shown hosted by provider system 106-1. Application 116-2, 116-3 and 116-4, for example, are shown hosted by provider system 106-M. Each of the multiple provider systems is configured to install one or more agents 118-1 to 118-M to manage communication between one or more hosted applications and the application delivery system 102. Thus, an agent can manage communications with multiple hosted applications. It will be understood that in managing communication between a user device and a hosted application, an agent manages flow of information after a user device has cleared security requirement imposed by the network security interface, that is, by the traffic processing layer 112. Moreover, multiple agents can be installed within a given provider system based upon factors such as a need to achieve high availability and maximal performance. The agents communicate with the management system 104 over the network 102 to obtain connection information for use to determine network communication paths to create with the backend traffic delivery layer 110 of the application delivery system 102. The management system 104 configures agents to each create a dynamic "pool" of network communication paths with the application delivery system 102 on behalf of each hosted application that it manages.

Each pool of network communication paths includes multiple network communication paths. The pools are "dynamic" in that the number of communication paths in a pool can change over time. The number of network communication paths in a pool can increase and decrease over time depending upon demand for the application served by the paths in the pool, for example. Moreover, the network communication paths are "pre-configured" in that a network communication path that is used to create a communication path between a user device and an agent is created prior to receipt of a user or device request that results in creation of that path between the user device and the agent. Thus, although some communication paths in a dynamic pool of network communication paths may be created or destroyed after a given user or device request is received, that given user or device request results in use of a communication path from the pool that was created before receipt of that given user or device request.

The management system 104 configures the application delivery system 102 and also configures the agents 118-1 to 118-M deployed at application provider systems 106-1 to 106-M via communication paths 103. In accordance with some embodiments, the management system 104 may dynamically determine the number of network communication paths in an application, agent connection pool for a given application. The determination of communication path pool size is dynamic in that the number of paths in a pool may vary over time depending upon demand for the application, for example. The policy optimization subsystem 113 monitors performance of the application delivery system 102, through the performance monitoring modules 111-1 to 111-3, and determines optimal configuration of the application delivery system 102 to achieve policy based performance objectives. Likewise, the policy optimization subsystem 113 monitors performance of the agents 118-1 to 118-4, and determines optimal configuration of the agents to achieve performance objectives.

The management system 104 can dynamically adjust configuration of the delivery system 102 and of the agents 118 based upon processing load and network traffic. For example, in operation the management system 104 may determine that an agent at a provider that has very high usage for a given application should configure an application agent connection pool, which is dedicated to communications with that given application, to have a larger number of connections between the system 102 and the agent. However, the management system 104 may determine that a different agent at a different provider that has lower usage for a given application should configure an application agent connection pool, which is dedicated to communications with that given application, to have a fewer number of connections. It will be appreciated that although only a few applications 116-1 to 116-4 are shown in the illustrative example embodiment security management system 100 and some of these are hosted by multiple providers, the system 100 may manage a wide variety of different applications in which different providers host different applications.

Multiple end-user devices 107-1 to 107-N, seeking to obtain access to one or more of the applications 116-1 to 116-4, dynamically create individual user device network communication paths 122-1 to 122-N with the frontend traffic delivery layer 108 of the application delivery system 102 to individually access individual hosted applications. The transaction processing layer 112 screens user device connections for security requirements and selectively stitches together frontend user device network communication paths with pre-existing backend application agent connections from a pre-configured application agent connection pool.

In operation, the application delivery system 102 isolates hosted applications from communication with user devices until after security requirements are satisfied. More particularly, the traffic processing layer 112 is functionally disposed between the frontend traffic director layer 108 and the backend traffic director layer 110 to ensure that security requirements are satisfied as a condition to stitching together an agent-initiated network communication path selected from a pool of such network communication paths that correspond to an application, and a user device-initiated network communication path corresponds to an end-user device so as to permit user device access to a provider-hosted application.

Assume, for example that user device 107-1 seeks to access hosted application 116-4. The traffic processing layer 112 determines whether security requirements are satisfied for the end-user device 107-1 to access hosted application 116-4. Assuming that security requirements are met, the traffic processing layer 112 stitches together one connection from application agent network connection pool 120-M, associated with the hosted application 116-4, and an end-user device network connection 122-1, associated with the end user device 107-1. With the stitching together complete, the application delivery system 102 acts as a bridge for communication between the agent 118-M and the end user device 107-1. The agent 118-M further inspects all traffic according to some embodiments, after which it too acts like a bridge, finally connecting the application 116-4 to the end user device 107-1.

In accordance with some embodiments, the application delivery system 102 stitches together application network connections (belonging to a connection pool initiated by an application agent) and end-user device network connections on a per user, per hosted application and per provider system basis so as to isolate communication traffic based upon user, based upon hosted application and based upon provider of the hosted application. Thus, for example, multiple different application provider systems can share compute resources of the application delivery system 102, while maintaining separation of communication traffic for different applications hosted by the same provider system and while also maintaining separation of communication traffic for the same application hosted by different provider systems, for example. This isolation of communication traffic allows for provision of different, customized, services and different, customized, accessibility/availability levels for different hosted applications and/or for different provider systems, for example.

Application Delivery System

Figure 2:
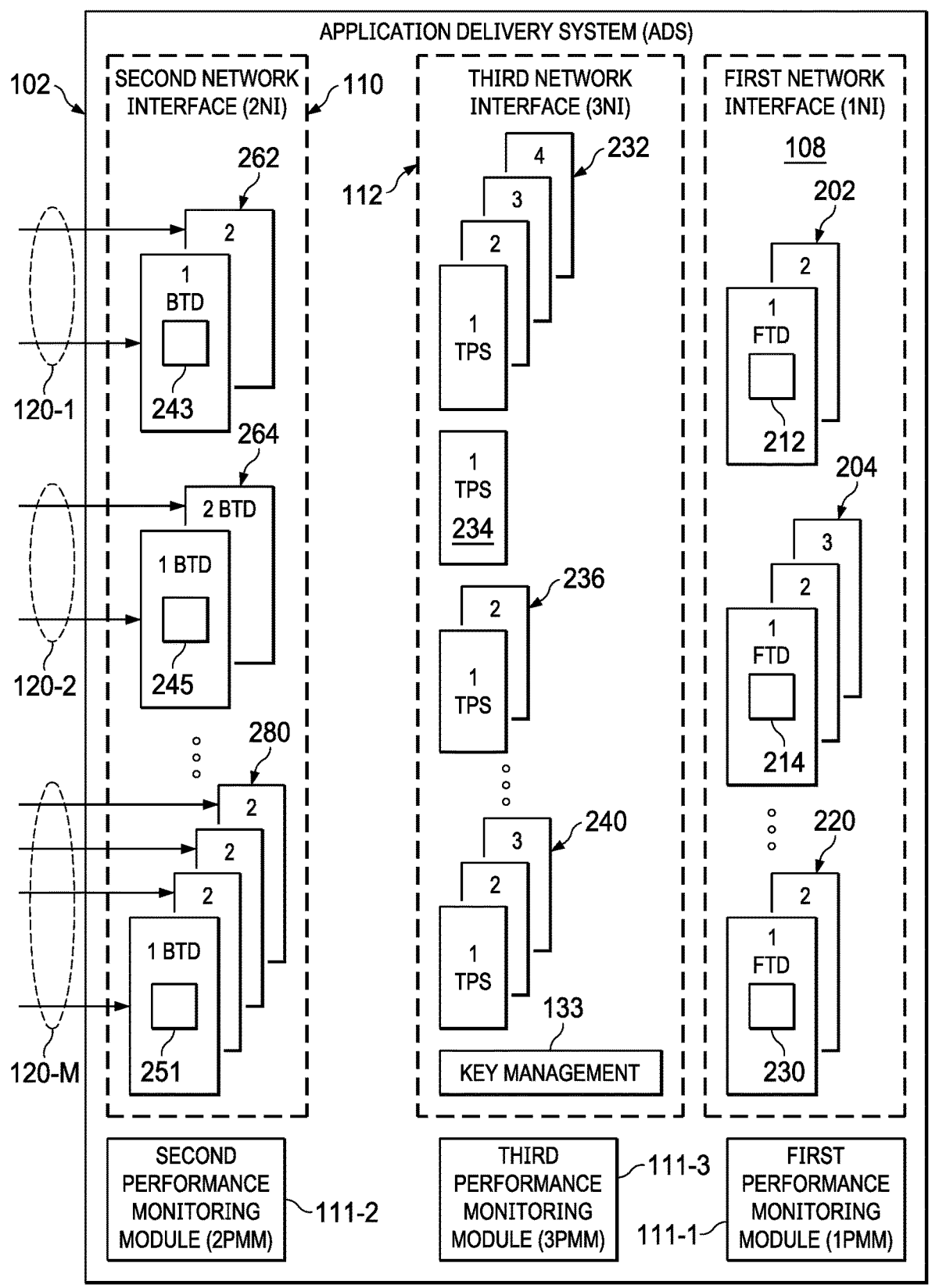
FIG. 2 is an illustrative block drawing showing certain details of an example configuration of the application delivery system of FIG. 1 in accordance with some embodiments.

FIG. 2 is an illustrative block drawing showing certain details of an example configuration of the application delivery system 102 in accordance with some embodiments. The frontend layer 108 includes a plurality of first network interface instances, referred to as frontend traffic director (FTD) instances, each associated with at least one network address, such as an IP address. The backend layer 110 includes a plurality of second network interface instances, referred to as backend traffic director (BTD) instances, each associated with at least one network address, such as an IP address. In accordance with some embodiments, each FTD is associated with a hosted application and a provider of the hosted application, and each BTD also is associated with a hosted application and a provider of the hosted application. The FTD instances and BTD instances access information in requests (received as one or more packets) being sent to hosted applications from end user devices to direct packets to traffic processing server traffic processing server (TPS) instances, which in turn apply routing and/or security policies. The FTD instances and BTD instances do not themselves decrypt packet data so as to avoid exposing encrypted packet data to exploitation at the edge of the delivery system 102. Rather, decryption occurs at the network security interface, i.e. the TPS layer 112, internal to the delivery system 102. Network security instances, referred to herein as TPS instances, are configured to decrypt received packets and to condition stitching together user device network communication paths to application agent network communication paths, which are created as part of an application agent connection pool, upon successful application of one or more routing and/or security policies to determine whether or not a user or device request is valid, typically including a user identification and a user authentication requirement. It will be appreciated that the term "frontend" and "backend" are terms of convenience used to distinguish between network interface instances configured as network interfaces to user devices on the external network 105 and network interface instances configured as network interfaces to application agents on the external network 105.

In some embodiments, the number of FTD instances, BTD instances and TPS instances or other instance types can be scaled independently with demand under control of the management system 104, for example. The number of FTD instances can scale independent of the number of BTD instances, and the number of network security instances, referred to herein as, TPS instances, can scale independently of the number of FTDs and BTDs. Assume for example, that an unauthorized attacker is trying to break into a hosted application by running a script that systematically tries out a large number of different passwords for a large number of users within a large company. At this instant, the load on the login servers (described below) may increase significantly. In response to that increased login load, the management system 104 may increase the number of login server instances, although the number of FTD, TPS and BTD instances is not increased. Alternatively, assume for example, that a large number of users begin downloading large files from a hosted application, and will hence tie up a number of FTD instances. In response to that increased download load, the management system 104 may increase the number of FTD instances and TPS instances to handle the increased volume of downloads, although the number of login server instances is not increased. Also, as system load such as, traffic volume and/or CPU usage and perhaps other system-wide characteristics vary, the management system may determine to add or terminate BTD instances.

Basically, for a given application, for example, there may be an increased system load resulting from an application due to increased use of compute, memory, disk, bandwidth (traffic volume), etc. Consequently, it may be necessary to add more resources (BTDs, TPSs and/or FTDs) to handle the extra load. Conversely, if the system load due to an application decreases, the number of instances dedicated to the application can be reduced.

As used herein an "instance" refers to a fully functional copy. It will be appreciated that the delivery system 102 includes hardware computer and storage resources that are configured to provide first network interface instance (i.e. FTD) functionality, second network interface instance (i.e. BTD) functionality, and network security interface (i.e. TPS) functionality. In some embodiments, scaling the number of first network interface instances (i.e. FTD instances), second network interface instances (i.e. BTD instances) and network security instances (i.e. TPS instances) involves increasing and decreasing the number of copies of each, depending upon demand. In accordance with some embodiments, FTD, BTD, TPS and other component functionality can be implemented using virtual machines (VMs) that timeshare the hardware resources, and the number of FTD, BTD and TPS instances is increased by spawning additional VMs and is decreased by releasing or destroying one or more of the VMs.

Alternatively, FTD, BTD, TPS and other component functionality can be implemented as process instances using operating system level virtualization in which different processes are partitioned to execute in different namespace partitions under the same operating system (OS) kernel, e.g. as Linux "containers." The OS kernel will run a single operating system and provide that operating system functionality to each of the components. Resources such as processors, storage and network I/O can be shared among processes executing in different namespace partitions. In accordance with some embodiments, different FTD, BTD and TPS instances can be implemented as Linux containers or independent instances.

Moreover, in accordance with some embodiments, FTDs and BTDs act as network interfaces with the external network 105. From a security perspective, FTDs and BTDs look at package information to direct traffic to the appropriate TPS instance. However, FTDs and BTDs do not decrypt data. TPS instances, however, actually process the payloads to perform functions such as applying security policies, checking the posture of the user accessing the app (e.g. whether the user has the right set of credentials, does he actually have permission to access the app given his current location, device type, etc.). TPS instances also stitch network communication paths together.

In some embodiments, the traffic processing layer 112 not only provides traffic stitching and user validation services, which may include user identification, which typically involves authentication checking services, but also, or alternatively, may provide services such as traffic encryption/decryption, end user identity management, end user authorization, end user session state storage, Layer 7 firewalling (also known as web application firewalling), intrusion prevention services (IPS), threat detection, anti-virus protection, analytics and business logic, for example. Each of these services may be provided using independently scalable modules, each dedicated to performing one or more of these specific functions. For example, some applications and/or some providers may require user identification/authentication. Other applications/providers may require not only identification/authorization, but also a determination as to whether a particular request is authorized. Other applications/providers may require deeper inspection of a request payload to scan for viruses, malware, of the like. Moreover, during a denial of service attack, for example, network traffic may increase tremendously prompting the management system 104 to instruct the delivery system 102 to scale up the number of instances of a module dedicated to thwarting such an attack.

The application delivery system 102 includes a first network interface 108, between user devices and the delivery system 102. The first network interface 108 is referred to herein as the frontend traffic director layer 108. An example frontend traffic director layer 108 shown in FIG. 2 includes a first FTD group 202 with two FTD instances, a second FTD group 204 with three FTD instances and a third FTD group 220 with two instances. The application delivery system 102 also includes a second network interface 110, between application agents and the delivery system 102. The second network interface 110 is referred to herein as the backend traffic director layer 110. An example backend traffic director layer 110 shown in FIG. 2 includes a first BTD group 262 with two BTD instances, a second BTD group 264 with two BTD instances and a third BTD group 280 with four BTD instances. The example traffic processing layer 112 includes a first TPS group 232 with four TPS instances, a second TPS group 234 with one TPS instance, a third TPS group 236 with two TPS instances and a fourth TPS group 240 with three TPS instances. It will be appreciated that the example system 102 may include additional FTD instances, BTD instances and TPS instances that are not shown so as to avoid unnecessarily complicating the drawing and description.

Each of the FTD instances of the frontend traffic director layer 108 shown is configured to manage setup of logical communication paths between dynamically created end-user device network communication paths, e.g., 122-1 to 122-N, containing requests for access to hosted applications, and TPS instances within the traffic processing layer 112 associated with that application. For each hosted application served by the application delivery system 102, the management system 104 directs creation of a number of FTD instances and TPS instances sufficient to handle the demand for end-user or device requests for the application. Different hosted applications may require different numbers of FTD and TPS instances depending upon end-user demand.

Thus, in accordance with some embodiments, different FTDs may be associated with different hosted applications, and each FTD instance includes a mapping to one or more TPS instances. The two example FTD instances of the first FTD group 202 include mappings 212 (only one shown) to at least one of the TPS instances of the traffic processing layer 112. The three example FTD instances of the second FTD group 204 are associated with a mapping 214 to at least one TPS instance of the traffic processing layer 112. The two example FTD instances of the third FTD group 220 are associated with a mapping 230 to at least one TPS instance of the traffic processing layer 112. The mappings 212, 214, 230 are created at the direction of the management system 104 and are implemented as data structures, such as a mapping tables, in a non-transitory storage device. Thus, the mapping 212 is used to provide mappings between dynamic user network communication paths (not shown) with the FTD instances of the FTD group 202 and a mapped-to TPS instance. The mapping 214 is used to provide mappings between dynamic user network communication paths (not shown) with the FTD instances of the FTD group 204 and a mapped-to TPS instance. The mapping 230 is used to provide mappings between dynamic user network communication paths (not shown) with the FTD instances of the FTD group 220 and a mapped-to TPS instance.

The TPS layer also includes a key management module 133, which ensures that all traffic belonging to an application provider system 106 is secured using a unique set of security keys. The system also ensures that all communication within the application delivery system 102, between the end user devices 107 and the FTD instances 108, and between the application agents 118 and the BTD instances 110, are all carried out using unique security keys. All keys are further encrypted and stored in non-transitory systems that are designed to be tamper proof. In accordance with some embodiments, SSL encryption or IPsec encryption can be employed, for example. The details of the encryption schemes, key creation and maintenance schemes, and tamper proof storage of said keys are well known to persons skilled in the art and need not be described herein.

For each hosted application that is to be made available to end-user devices, the application delivery system 102 is configured to maintain a logical set of paths (connection pool) from its point of presence (POP) to the hosted application's point of presence. These paths generally are made available in advance of end-user device activity requesting access to the hosted application. All paths rely on connections from application agent connection pool 120-M that are initiated from the application connection agent 118-M that is present in the application provider system. A given path is only usable by a single end-user device at any given time, and only after the access has been fully inspected by all validation services (e.g., authentication, authorization, web application firewalling, etc.) configured for the hosted application. Referring now to both FIG. 1 and FIG. 2, each of the two BTDs of the first BTD group 262 has a pool 120-1 comprising preconfigured hosted application agent network connections with the agent 118-1 associated with a first hosted application 116-1. Each of the two BTDs of the third BTD group 264 has a preconfigured hosted application agent network connection pool 120-2 with a second agent (not shown) associated with a second hosted application (not shown). It will be appreciated that in the illustrative example system 100, a single agent 118-1 can be associated with hosted applications 116-1, 116-2 and 116-3, depending on configuration. Each of the four BTDs of the third BTD group 264 has a preconfigured hosted application agent connection pool 120-M with an Mth agent 118-M associated with an Mth hosted application 116-4. For each hosted application served by the application delivery system 102, the management system 104 directs creation of a number of BTD instances sufficient to handle end-user device demand for the hosted application.

As explained more fully below, the hosted application agent connections pools 120-1 to 120-M are created at request of the agents 118-1 to 118-M running on application provider systems 106-1 to 106-M. Thus, for example, agent 118-1 requests application agent connections pools 120-1 with each of the two BTDs of the first BTD group 262. These connections 120-1 to 120-M are made independent of, and in advance, of user or device requests for access to hosted applications. In other words, for example, the agent 118-1 requests application agent connection pools 120-1 with each of the two BTDs of the first BTD group 262 even before a user or device request to access hosted application 116-1. The size of this pool can vary depending on some embodiments and on the change in network load, available bandwidth, etc.

As explained above, one role of the individual TPSs within the traffic processing layer 112 is to stitch together dynamically created user-device network connections to FTDs within the frontend traffic delivery layer 108 with pre-configured network connections between agents and BTDs within the backend traffic delivery layer 110. Each BTD instance is associated with a mapping to one or more TPS instances. The two example BTD instances of the first BTD group 262 include a mapping 243 to at least one of the TPS instances of the TPS layer 112. The two example BTD instances of the second BTD group 264 include a mapping 245 to at least one TPS instance of the TPS layer 112. The four example BTD instances of the Mth BTD group 280 are associated with a mapping 251 to at least one TPS instance of the TPS layer 112. The mappings 243, 245, 251 are created at the direction of the management system 104 and are implemented as data structures, such as mapping tables, in a non-transitory storage device.

Assume for example that for a given application, one of the FTD instance mappings 212, 214, 230 maps a dynamically created end-user network connection (not shown) to a TPS instance of the second TPS group 232. In that case, during stitching, the mapping 242 can be used to stitch the mapped to end-user device network connection to an application connection associated with a BTD that the mapping 244 maps to. In accordance with some embodiments, stitching together an end-user device-side network connection and an application agent-side network connection may be contingent upon meeting security requirements. The result is that, contingent upon meeting security requirements, an end-to-end path (or bridge) is created, through the application delivery system 102, between an end-user device and an application (via an associated agent). It should be appreciated that this bridge has two inherent checkpoints where services can be applied: One within the TPS where the stitching takes place, and second within the application agent that initiated the application agent connection pool to the BTD. This bridge is used to deliver the application, or services provided using the application, to and from the end user's device.

Further details of a secure application delivery system with dial out capability (such as depicted in FIGS. 1 and 2 above) are also described in U.S. Pat. No. 9,491,145, the disclosure of which is incorporated herein by reference. As described there, an Application Provider System (APS) is the enterprise data center with hosted applications and enterprise connectors that establish a pool of communication paths with the ADS and have a direct access path to the hosted applications. From the SSO perspective (described in more detail below), the enterprise connector needs to authenticate the connection with the hosted application using the configured authentication method on the hosted application. To complete authentication, it requires access to the encrypted token prepared during the authentication step. There can be more than one APS instances operated by the enterprise and they can be in geographically separate locations. Each APS can have more than one enterprise connectors for high availability and load sharing.

An Application Delivery System (ADS) is where the session information is stored by a login endpoint and an application endpoint. There can be more than one ADS instance in the CDN or cloud environment. The ADS itself preferably comprises separate components that are identified as BTD, TPS and FTD. The TPS module executes the logic for the authentication status of an inbound request from the user agent, selection of the appropriate communication path to reach one of the connectors in the APS for access to the application, and (as described in more detail below) inserts the encrypted tokens required by the enterprise connector for SSO with the forwarded request.

Figure 3:
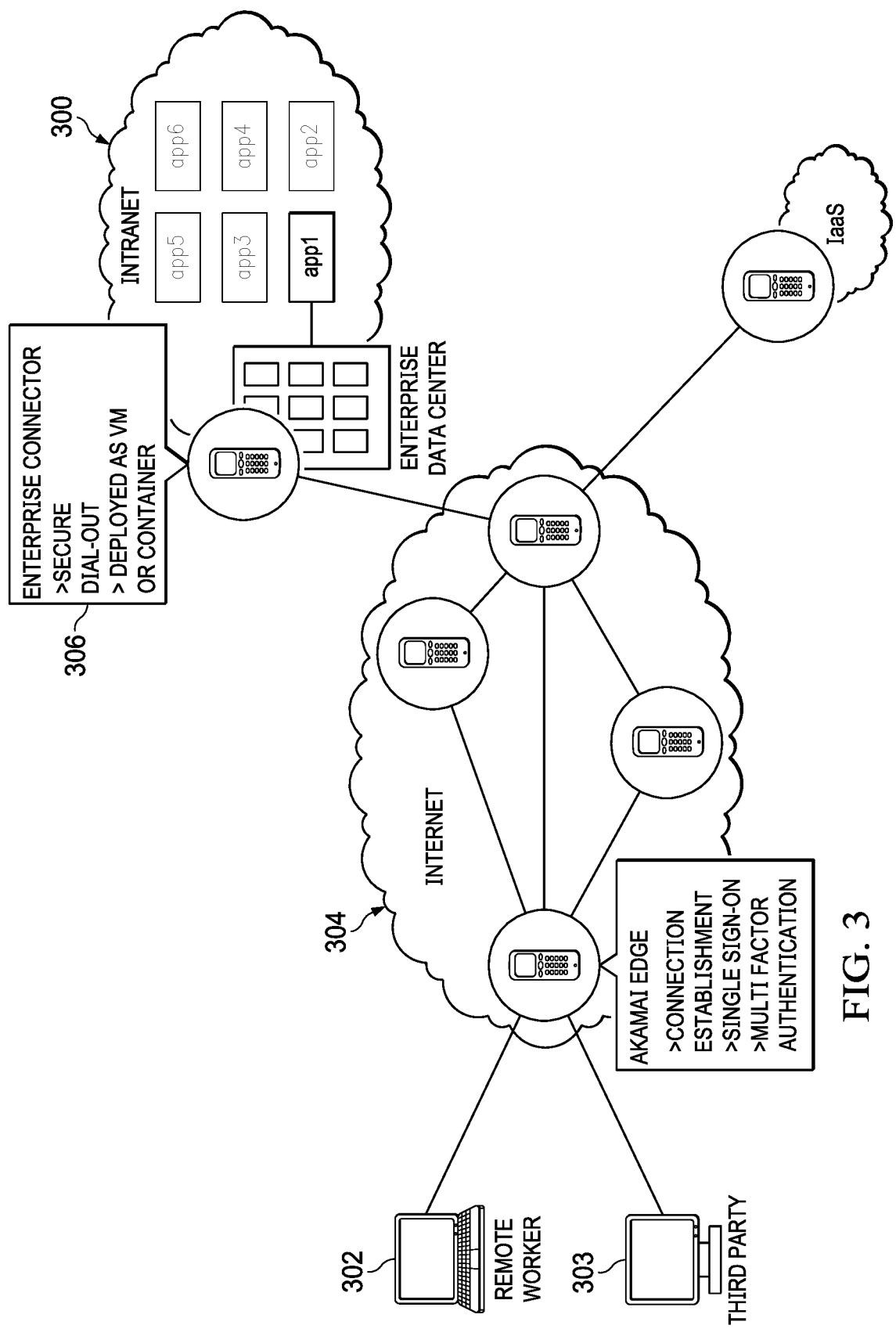
FIG. 3 depicts a secure application-specific remote access service provider by a service provider, such as a content delivery network (CDN)

FIG. 3 depicts a representative implementation scenario for the techniques of this disclosure. The approach leverages the architecture described above with respect to FIGS. 1 and 2. This example scenario, which is not intended to be limiting, is a managed enterprise application access service by which a service provider can help enterprises streamline remote access while improving their security posture, in particular by providing clientless, application-specific remote access. A representative service provider may be a content delivery network (CDN) service provider, such as Akamai Technologies, Inc. of Cambridge, Massachusetts. More generally, the managed application access service is facilitated by a cloud provider. In this embodiment, the enterprise application access service provides authorized, secure access to specific enterprise applications—such as Appl 300—but preferably to nothing else on the enterprise network. In this manner, in effect an air gap is created between private enterprise applications and infrastructure, and the Internet—which minimizes the attack surface and ensures that the enterprise infrastructure is invisible to the public. To this end, preferably all that is required at the remote client 302 is an HTML5 compliant web browser, the CDN 304 (or, more generally, a cloud-based platform), and an enterprise connector 306 in the datacenter or virtual private cloud (VPC). The connector corresponds to the TPS in the above-described embodiments.

The enterprise connector supports most hypervisors and containers and integrates with the enterprise's identity store; it mutually authenticates with the CDN infrastructure, preferably over TLS. Thus, preferably there is not local enterprise connector management, and there are no inbound open tunnels or ports to the enterprise beyond the standard HTTPS ports that enable the enterprise connector to dial-out to the CDN platform when required. At the same time the user authenticates, using multi-factor authentication (MFA) if required or desired, through the browser over TLS with the CDN and the enterprise's identity store supporting Single Sign-On (SSO). Once securely authenticated, the service provider simply stitches together the two TLS sessions over the CDN to provide the client access only to the authorized applications on the enterprise network, but preferably to nothing else. In turn, an enterprise application hosted behind the firewall is now accessible to remote workers 302 and third parties 303, with SSO and MFA support, through a simple web browser or mobile application, without exposing the entire enterprise network and mitigating unfettered lateral movement between all applications on the network. Although not required, preferably all traffic traverses the CDN to improve the reliability and performance of application access over the Internet.

As previously described, there may be multiple enterprise connectors including in different geographic locations.

SSO in Disjoint Networks with Non-Overlapping Authentication Protocols

With the above as background, the technique of this disclosure is now described in additional detail.

In this approach, and as will be seen, a remote end user is first authenticated, preferably just using a simple HTTP-POST based HTML form authentication (e.g., by entering username and password) over HTTPS. The authentication is provided by a login server (LS), preferably operated in the CDN or cloud. Once the user is successfully logged-in in this manner, the login server validates the user's identity in the enterprise, e.g., by passing the user credential to an enterprise connector, which interacts with the enterprise's identity management system (e.g., LDAP, Active Directory, etc.). If the enterprise connector validates the identity, the connector encrypts the user's credential to generate a token, which is then returned to the login server and stored centrally (i.e., in the CDN or cloud). The data store used to store tokens is highly-available and can be accessed by different connectors regardless of where those connectors are located. Thereafter, the stored token is used to enable SSO access to one or more applications in the enterprise irrespective of the particular authentication protocols that are actually used in the enterprise environment. The enterprise protocols may be of different types (e.g., NTLM, Kerberos, etc.) and, often, these protocols—due to their characteristics or other issues—are not readily useable for the type of remote access scenario here. According to this disclosure, the enterprise authentication protocols are bridged transparently and without changing the application(s), and also without the end user's knowledge. In effect, the end user's simple forms-based authentication is translated under the covers into whatever authentication protocol might be needed in the enterprise; this authentication protocol translation is carried out by the connector, and it is performed gracefully without application or end user involvement or knowledge.

Using this approach, an end user's identity in the enterprise can be validated at a first connector, but then that identity can be used at a second connector to facilitate access to an application being secured by the second connector.

Figure 4:
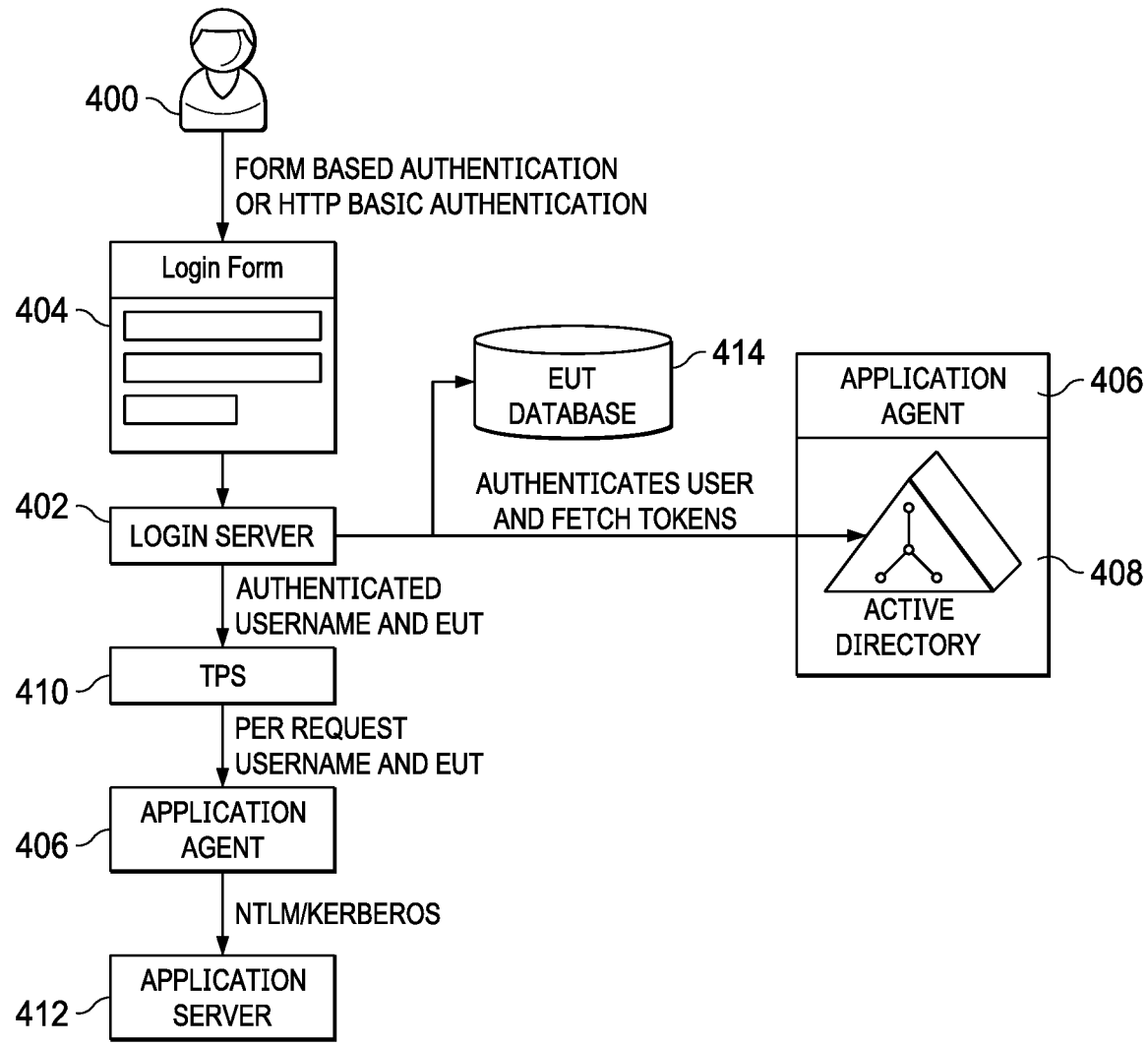
FIG. 4 depicts the basic operating scenario of this disclosure to facilitate single sign-on (SSO) in disjoint networks with non-overlapping authentication protocols.

The basic technique is shown in FIG. 4. Here, the end user 400 interacts with the login server 402 to enter username and password, typically via an HTML login form 404. This username and password is sent to an application agent 406, which is an entity that facilitates the authentication protocol translation operation according to an aspect of this disclosure. The application agent 406 knows how to communicate/interoperate with an enterprise directory store (e.g., LDAP, Active Directory, etc.) 408. Once the end user 400 is successfully authenticated by the login server 402 and his or her identity verified at the enterprise directory store, then the user's authentication credential (e.g., password) is encrypted with a private key, with the result then being returned to the login server 402 for storage. In some embodiments this login server is part of a TPS/connector 410. Preferably, the private key is uniquely associated to the TPS. As noted above, and because of the nature of authentication within the enterprise can vary, it is assumed that the application server 412 may expect different types of authentication methods, such as NT LAN Manager (NTLM), Kerberos, or others. According to this disclosure, and upon a subsequent access by the end user, the application agent 406 transparently performs authentication with the application server 412 in the enterprise's native authentication protocol (i.e., NTLM, Kerberos, etc.) on the end user's behalf. In this manner, the end user only has to enter his or her username and password in the HTML form 404 served by the login server instance 402 and is given access to the application server 412 irrespective of the underlying authentication protocol requirements.

As also depicted in FIG. 4, the encrypted user token (EUT) created during this process preferably are stored at a central (cloud-based) user properties database (UPDB) 414 as and when an authentication event occurs. In some embodiments, and as depicted, the interface to UPDB 414 provided by the login server 402, although this is not a requirement. Preferably, UPDB 414 is hosted in the cloud and is highly-available and accessible to enterprise connectors. When an authentication event (e.g., a successful user login via the login server instance) occurs, the EUT is generated and stored into UPDB.

Thus, according to this technique, upon authenticating the end user with the enterprise directory store or similar entity, a token is generated by the application agent and is encrypted, preferably with an asymmetric private key. Preferably, the private key used to encrypt the token is known only to the application agent (or group thereof) and not to the UPDB. In some embodiments, the tokens are encrypted with elliptical curve-based private keys, although other cryptographic protocols may be used. Upon receiving the EUT from the authentication agent 406, the login server 402 stores it into UPDB 414 and associates this EUT with the end user that is currently being authenticated.

In some embodiments, such as when the application server 412 is configured with a Kerberos authentication method, EUT is an encrypted Kerberos Ticket Granting Ticket (TGT) or Service Ticket (ST) obtained by the authentication agent on the end user's behalf. When the application server 412 is configured to use other authentication protocols, however, such as NTLM, EUT is an encrypted user password. In either case, the authentication agent facilitates the underlying authentication protocol translation to enable the end user SSO-access to the application server despite the differences in the underlying authentication protocols.

Figure 5:
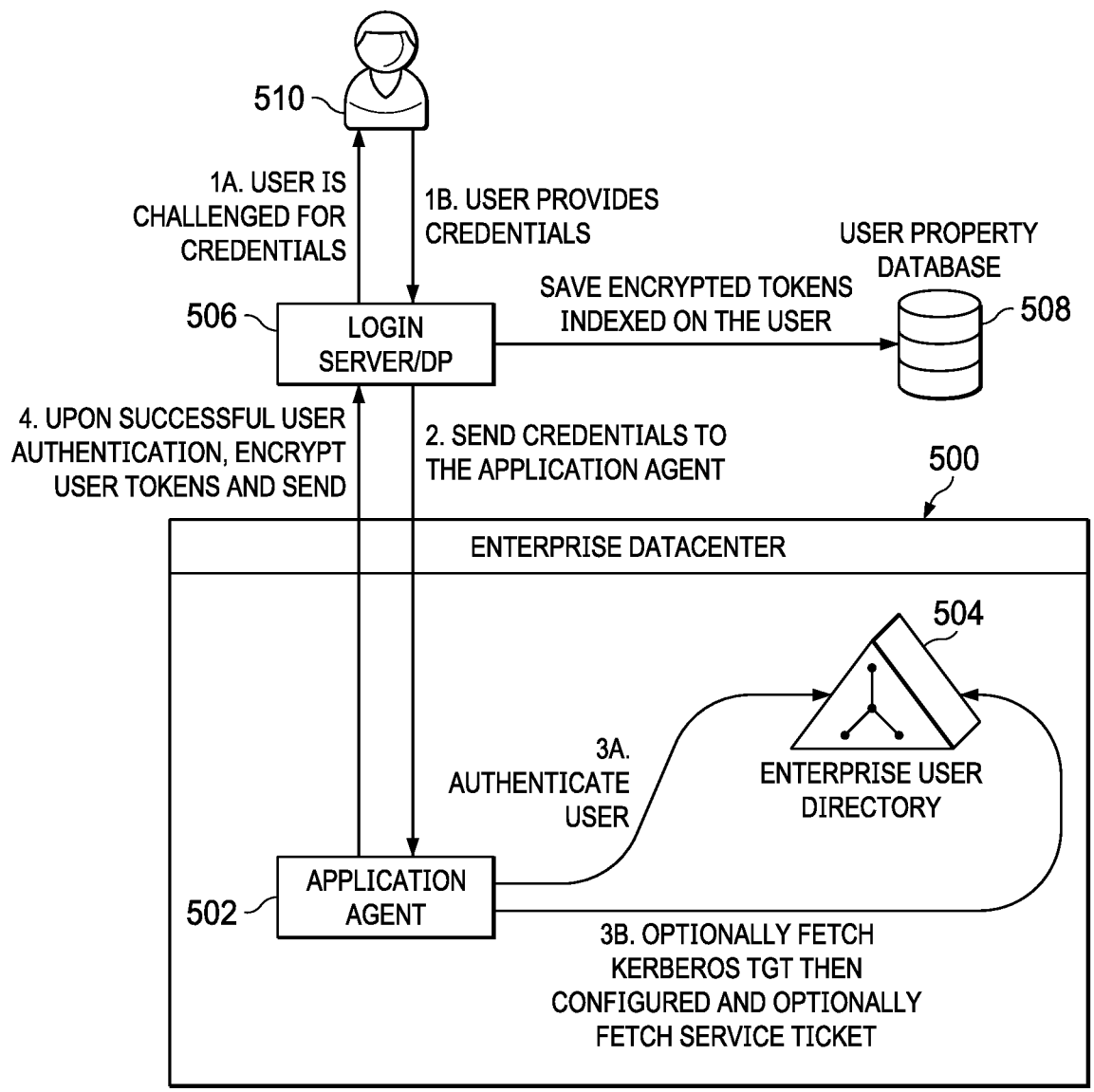
FIG. 5 is another depiction of a preferred approach to enable a remote end user to obtain SSO-based access to an application in an enterprise.

FIG. 5 is another depiction of the process of this disclosure. In this scenario, the enterprise datacenter 500 comprises the application agent 502, and the enterprise user directory 504. As noted above, the application agent 502 may comprise part of the enterprise connector. Typically, the application agent is software executing in a hardware processor. A separate login server/identity provider 506 is associated with the enterprise datacenter 500 and includes the user properties database 508. When a non-authenticated user 510 accesses an enterprise application via TPS, TPS redirects the user login server 506 (LS) get the user authenticated. At step 1A, the login server 506 challenges the user for username and password, and optional second factor (when 2FA is implemented). The user 510 provides his or her credential as indicated at step 1B. At step 2, the login server 506 then proceeds to authenticate the user (i.e., by verifying the credential) by consulting the appropriate enterprise user directory 504, in conjunction with verifying the optional second factor (e.g., a code sent in email, or via SMS, etc.). As depicted, this operation may occur via the application agent 502, although in some cases the login server may interact directly with the enterprise user directory. In some embodiments, this user directory is Active Directory. When the application agent 502 is used to interact with the enterprise user directory 504, the agent authenticates the user as depicted at step 3A; step 3B indicates an optional path (when Kerberos is used within the enterprise) wherein the application agent 502 fetches the Kerberos TGT or Kerberos Service Ticket. Upon successfully authenticating the user, the application agent generates the EUT and sends it back to the login server. This is step 4. At step 5, the login server then stores the EUT in the UPDB 508.

As depicted in FIG. 6, after a successful user authentication (a positive outcome of a test at step 600), the login server preferably redirects the user to a TPS instance and informs the TPS that the user is successfully authenticated. This is step 602. TPS, upon seeing a new authenticated user, fetches the EUT from the UPDB and sends this EUT to the application agent as part of the user request. Preferably, additional information is fetched along with the EUT to provide for a user assertion (UAS).

In some embodiments, EUTs are temporarily cached locally and are indexed with a specific user for a configured amount of time. The TPS, upon seeing subsequent requests from the same user, fetches the locally-cached tokens and sends these tokens along with the user request to the application agent. A convenient way to transport the EUT is to provide it to the application agent in an HTTP request header.

As noted above, a feature of this disclosure is the notion of authentication protocol translation. In the typical use case, the end user is first authenticated with a username or password, and an optional second factor. In some embodiments, this initial authentication involves the user being authenticated with a certificate as well. Nevertheless, the authentication methods on the application server require that the user identity be translated into the authentication method that is understood by the server. Thus, and as has been described, when the application server is configured to use NTLM or Kerberos, preferably the TPS sends the username and EUT to the application agent as part of the user request (e.g., in an associated HTTP request header). Typically, this information is not tied to any connection used between TPS, BTD and the application agent. Upon receiving username and EUT from TPS, the application agent decrypts the EUT (e.g., with the key known only to itself), and then extracts the information needed for the authentication protocol configured within the enterprise.

Thus, for example, when the application server is configured to use NTLM, the decryption of the EUT results in the user password. Now that the application agent has a username and password, it initiates a new connection to the application server and completes the NTLM authentication protocol. Thereupon, the application agent marks this connection as authenticated and binds this connection to an inflight user request. Upon completing the user request, the application agent preferably keeps this connection in a connection pool keyed on the user. When available, this authenticated connection is used in subsequent requests for the same user.

On the other hand, when the application server is configured to use Kerberos, the decryption of the EUT results in a Kerberos Service Token. By using the Service Token, the application agent then generates a GSSAPI token. The application agent then creates a new connection with the application server. Upon successful connection establishment with the application server, the application agent sends the GSSAPI token to the application server, e.g., in an HTTP Authorization header, on the newly-created connections. The user request preferably is also sent of the same connection. Upon completing the user request, the application agent keeps this connection in a connection pool keyed on the user. When available, this authenticated connection is then used in subsequent requests for the same user.

In summary, the approach herein is operative to authenticate the user, create the authentication token, encrypt the token for confidentiality during transport of the token (from the connector to the storage database), maintain confidentiality of the token when it resides in storage, and maintains confidentiality of the token during transport from the storage, e.g., to another connector. After decrypting, the authentication token is used to perform single sign-on (SSO) into the target application using the SSO mechanism configured on the application.

Preferably, there is a TPS component in the cloud that performs several tasks. This component creates a session context for application access, binds this session context to a cookie or bearer token in the user agent, and it also associates the authentication token for SSO to this session in the data storage. The TPS component also preferably load-balances traffic streams from a single user session between or among a plurality of the enterprise connectors, while also forwarding the authentication token bound to the user session from the storage to the connector. In case of connector failures, the TPS component switches the user session traffic over to other active connectors in the enterprise, all without affecting the single sign-on functions for the authenticated user session.

This system allows an enterprise administrator to layer additional authentication methods at the login server in addition to the username/password credentials required for NTLM/Kerberos. For example, the administrator may require client certificate-based authentication as well as additional OTP methods on the login server, which may not be natively available when the user directly accesses the application over the local network.

The technique herein thus enhances an operation of a secure Application Delivery System (ADS). In particular, and as has been described, the ADS login endpoint (the login server) redirects the user agent to the ADS application access endpoint (the application agent). The ADS application endpoint obtains from the login endpoint the encrypted user token, preferably along with the proof of authentication. The application endpoint creates a new session and binds the session to information stored in the ADS shared database. This information also includes the encrypted user token. A session cookie or a bearer token is also delivered to the user agent, and which is provided to the application endpoint in subsequent requests from the user agent. The ADS then selects the appropriate enterprise connector to forward the request to and also includes the encrypted user token with the request. The enterprise connector decrypts the token and, based on the configured authentication scheme or authentication challenge from the origin, performs the Single Sign-On (SSO) function.

Enabling Technologies

The techniques herein may be implemented in a computing platform. One or more functions of the computing platform may be implemented conveniently in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server. While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

As noted above, one preferred implementation of the detector is in a managed service such as a content delivery network (CDN) or, more generally, an "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

Other enterprise-based authentication methods (besides NTLM and Kerberos) may be supported in the scheme. Thus, any other authentication method that relies upon the same set of credentials encrypted in the user token may be used. For example, if the origin presents a login form, then it is possible for the enterprise connection to automatically POST the credential to the origin instead of delivering the login form to the user agent. This technique is called "form replay."

What is claimed is as follows:

1. A method of enabling single sign-on (SSO) access to an application executing in an enterprise, comprising:
at a connector device associated with and located external to the enterprise, the connector device providing end users external to the enterprise with authorized, network-based secure access to an application without inbound open tunnels or ports to the enterprise, the application being configured for access via multiple, distinct authentication methods:
during a first access to the application, and responsive to successful authentication of a user via a first authentication method, encrypting a credential associated with the successful authentication to generate an encrypted user token;
storing the encrypted user token in a database;
during a second, subsequent access to the application, and following a redirect that returns the user to the connector device, fetching the encrypted user token from the database;
decrypting the encrypted user token to recover the credential; and
performing an authentication protocol translation by using the recovered credential to authenticate the user to the application via a second authentication method non-overlapping to the first authentication method.

2. The method as described in claim 1 wherein the first authentication method is an HTML form-based authentication initiated from a client browser.

3. The method as described in claim 2 wherein the second authentication method is NTLM or Kerberos.

4. The method as described in claim 1 wherein the credential is encrypted with a private key uniquely-associated with the connector.

5. The method as described in claim 1 wherein the first authentication method also includes a second factor of authentication.

6. The method as described in claim 1 wherein the redirect is initiated from a login server operated by a service provider.

7. The method as described in claim 6 further including the login server providing an HTML login form to facilitate the authentication using the first authentication method.

8. The method as described in claim 1 further including receiving the encrypted user token.

9. The method as described in claim 8 wherein the encrypted user token is received via an HTTP header.

10. The method as described in claim 1 wherein the second authentication method includes generating a connection, and wherein the connection is maintained in a connection pool keyed to the user.

11. The method as described in claim 10 further including using the connection to manage additional requests for the user.

12. A computer program product in a non-transitory computer readable medium comprising computer program instructions executable by a hardware processor and configured as a connector device associated with and located external to an enterprise to enable single sign-on (SSO) access to an application executing in the enterprise, the computer program instructions configured to:
during a first access to the application, the application being configured for access via multiple, distinct authentication methods, and responsive to successful authentication of a user via a first authentication method, encrypt a credential associated with the successful authentication to generate an encrypted user token;
store the encrypted user token in a database;
during a second, subsequent access to the application, and following a redirect that returns the user to the connector device, fetch the encrypted user token from the database;
decrypt the encrypted user token to recover the credential; and
perform an authentication protocol translation by using the recovered credential to authenticate the user to the application via a second authentication method non-overlapping to the first authentication method;
the connector device providing end users external to the enterprise with authorized, network-based secure access to the application without inbound open tunnels or ports to the enterprise.

13. The computer program product as described in claim 12 wherein the first authentication method is an HTML form-based authentication initiated from a client browser, and the second authentication method is one of: NTLM, and Kerberos.

* * * * *